(12) United States Patent
Allen et al.

(10) Patent No.: US 8,196,966 B2
(45) Date of Patent: Jun. 12, 2012

(54) SECURITY LAMINATES AND DOCUMENTS

(75) Inventors: Philip John Allen, Nottingham (GB); Andrew John Gilbert, Kent (GB)

(73) Assignee: Filtrona United Kingdom Limited

( * ) Notice: Subject to any disclaimer, the term of this patent is extended or adjusted under 35 U.S.C. 154(b) by 1173 days.

(21) Appl. No.: 11/748,285

(22) Filed: May 14, 2007

(65) Prior Publication Data
US 2007/0298205 A1 Dec. 27, 2007

(30) Foreign Application Priority Data
May 13, 2006 (GB) .................................. 0609569.9

(51) Int. Cl.
B42D 15/00 (2006.01)
B32B 9/00 (2006.01)
B32B 33/00 (2006.01)

(52) U.S. Cl. ........ 283/109; 283/94; 428/42.1; 428/42.3; 428/914; 428/915

(58) Field of Classification Search ............. 283/81, 283/94, 100–101, 105, 108–109; 428/42.2–42.3, 428/914–915, 40.1, 41.6, 41.8, 42.1
See application file for complete search history.

(56) References Cited

U.S. PATENT DOCUMENTS

| | | | | |
|---|---|---|---|---|
| 4,728,377 A * | 3/1988 | Gallagher | ........................ | 156/58 |
| 4,728,380 A * | 3/1988 | Jones et al. | .................. | 428/40.1 |
| 5,319,475 A * | 6/1994 | Kay et al. | ..................... | 283/108 |
| 5,587,214 A * | 12/1996 | Mitchell, Jr. | ................. | 428/40.1 |
| 6,135,503 A * | 10/2000 | Lob et al. | ...................... | 283/109 |
| 6,146,777 A | 11/2000 | Waller | | |
| 7,744,975 B2 * | 6/2010 | Thiele et al. | ................. | 428/40.1 |
| 2003/0077428 A1 | 4/2003 | Ishida et al. | | |
| 2003/0180493 A1* | 9/2003 | Hirashima et al. | ........... | 428/40.1 |
| 2003/0223800 A1* | 12/2003 | Wiklof et al. | ................ | 428/42.1 |
| 2004/0065403 A1 | 4/2004 | Hattori et al. | | |
| 2004/0224103 A1 | 11/2004 | Karst et al. | | |
| 2005/0079341 A1 | 4/2005 | Masuda et al. | | |
| 2005/0248147 A1* | 11/2005 | Staub et al. | .................... | 283/81 |

(Continued)

FOREIGN PATENT DOCUMENTS
EP 1 813 442 8/2007
(Continued)

OTHER PUBLICATIONS

International Preliminary Report on Patentability received in PCT/GB2007/001746, mailed Nov. 27, 2008, 6 pages.
(Continued)

Primary Examiner — Edward Tolan
Assistant Examiner — Kyle Grabowski
(74) Attorney, Agent, or Firm — Fish & Richardson P.C.

(57) ABSTRACT

A laminate 40 for a tamper-resistant identity document, the laminate comprising: a carrier film (10, FIG. 1) having a first adhesive layer 11 on a surface thereof, the first adhesive layer 11 comprising one or more visible registration features 13; and a cover film (20, FIG. 2*b*) having a first surface (20*a*, FIG. 2*b*) removably bonded to the first adhesive layer 11 and a second surface (20*b*, FIG. 2*b*) having a printed security feature 41, 42, 43 and a second adhesive layer (32, FIG. 3*b*) thereon. The cover film may have a thickness of no greater than 12 microns. The printed security feature may be in predetermined registration with the one or more visible registration features of the first adhesive layer.

24 Claims, 7 Drawing Sheets

U.S. PATENT DOCUMENTS

2006/0145467 A1   7/2006   Burchard

FOREIGN PATENT DOCUMENTS

| | | |
|---|---|---|
| GB | 2 128 581 | 5/1984 |
| GB | 2 352 708 | 2/2001 |
| JP | 2002-323856 | 11/2002 |
| JP | 2003-285599 | 10/2003 |
| WO | WO 84/02309 | 6/1984 |
| WO | WO 93/12940 | 7/1993 |
| WO | WO 03/106185 | 12/2003 |

OTHER PUBLICATIONS

International Search Report and Written Opinion, received in PCT/GB2007/001746, mailed Aug. 30, 2007, 8 pages.

\* cited by examiner

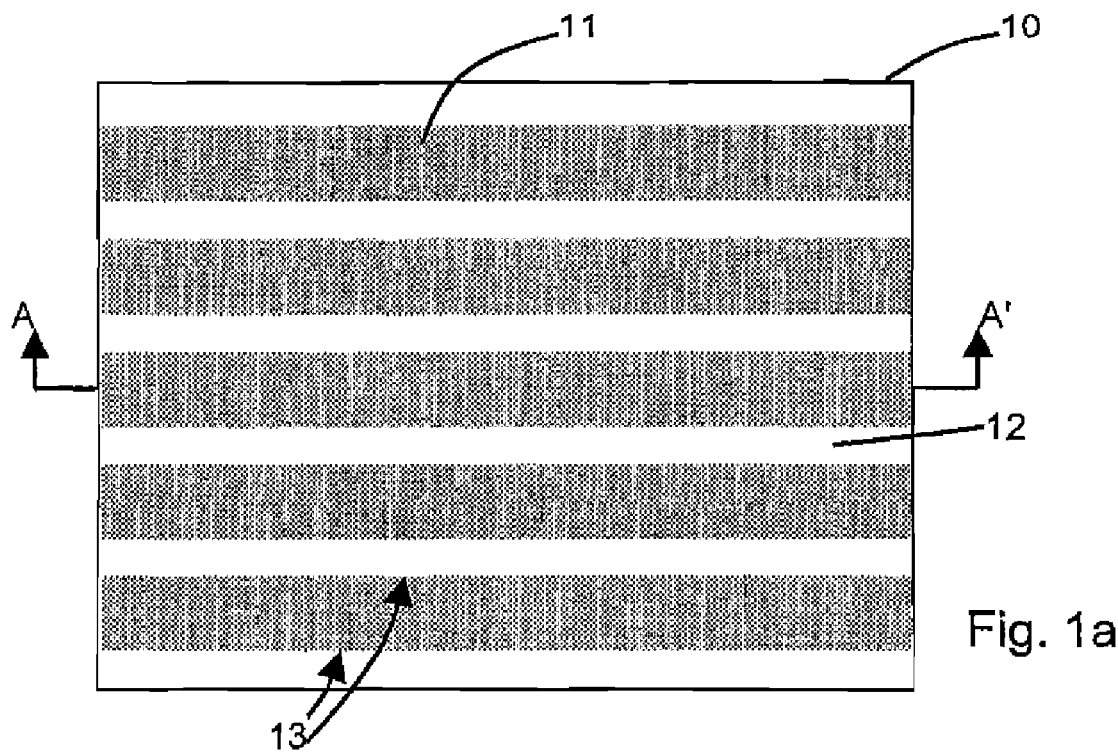
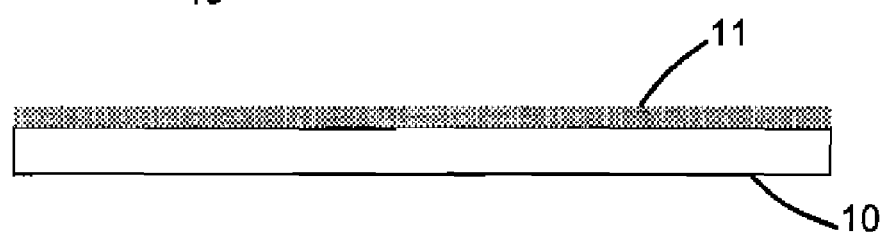
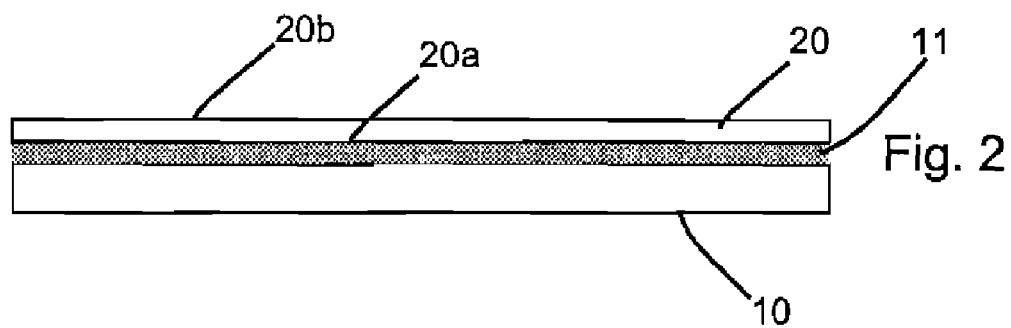

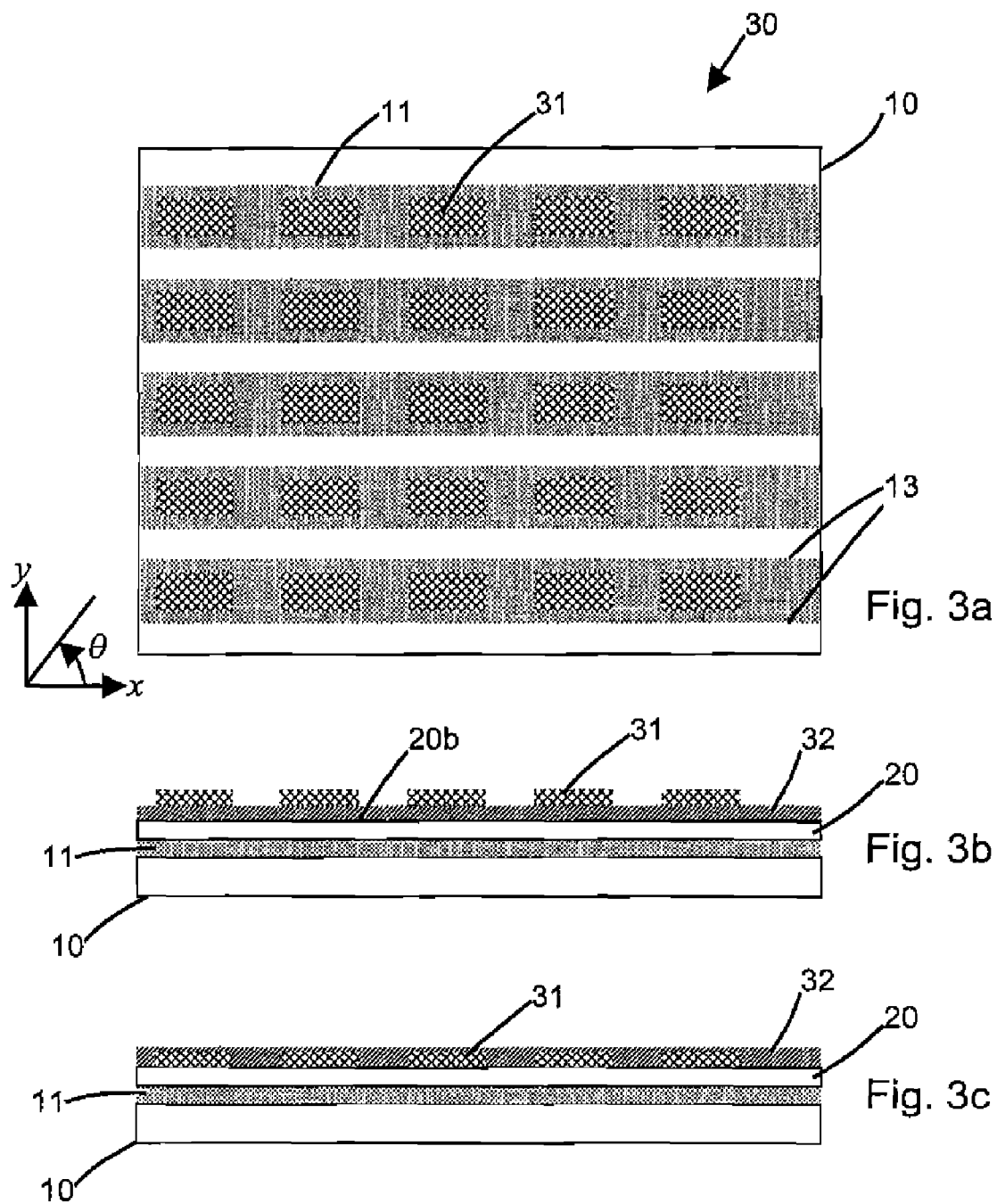

SECURITY LAMINATES AND DOCUMENTS

The present invention relates to the field of protective and tamper-resistant or tamper-evident security laminates, and in particular though not exclusively to security film laminates for identity documents.

To reduce the possibility of forgery or tampering, documents may be provided with security features. Many and varied security features are possible, including guilloche and fine line printing, holograms and other optically variable devices, microprinting, UV-visible features and others. Such features may be applied directly to a surface of a document such as a paper or card document. Example documents are identity cards, driving licences and passports.

One aim of a potential counterfeiter or forger may be to alter the details of a document such that it can then be reliably passed off in an amended form. For example, it may be technically feasible to alter an identity document so that it shows the details of a person other than that to whom the document was originally issued. Alternatively, details of the person identified on the document may be altered. To avoid or minimise the risk of undetectable amendments being made, varying degrees of security features can be applied to a document.

One simple security feature is that of a plain transparent film applied by laminating to a surface of a document, thus covering and protecting the underlying details. The film is typically a polymer film of a material such as PET (polyethylene terephthalate) or polyester with a heat sealable adhesive layer. This provides a minimum level of security, and may also commonly be used simply to protect the details on the document from being worn away by use. However, a potential disadvantage is that removing the laminated film and thus exposing the underlying details may permit alteration of the details. After alteration, a similar or the same film may then be reapplied, and the document made to a certain extent indistinguishable from a genuine unaltered document.

Security features may additionally be applied to the film itself. This would reduce the possibility of being able to reapply a similar film, depending on the degree of security provided. However, it may still be possible to remove the film in one piece, alter the underlying document and then reapply the same film. With this possibility, any type of security features in or carried by the film would not necessarily make the document resistant to alteration.

To further improve security of a document protected by a laminated film, printed security features may be applied to the underside of the film, such that the printed security features are thereby laminated between the film and the document. This makes removal of the film without damage of the printed security features more difficult. However, such films are typically of a thickness of 50 microns or greater, to allow for handling of the film during the printing process and subsequent lamination to the document. Removal and re-application of the film therefore remains a possibility.

It is an object of the present invention to reduce the possibility of undetectable tampering of a document.

It is a further object of the invention to provide a film having features or properties that make undetectable alteration of a document to which the film is applied more difficult or impossible.

In a first aspect, the invention provides a laminate for a tamper-resistant identity document, the laminate comprising:
a carrier film having a first adhesive layer on a surface thereof, the first adhesive layer comprising one or more visible registration features; and
a cover film having a first surface removably bonded to the first adhesive layer and a second surface having a printed security feature and a second adhesive layer thereon, wherein the cover film has a thickness of no greater than 12 microns.

In a second aspect, the invention provides a laminate for a tamper-resistant identity document, the laminate-comprising:
a carrier film having a first adhesive layer on a surface thereof, the first adhesive layer comprising one or more visible registration features; and
a cover film having a first surface removably bonded to the first adhesive layer and a second surface having a printed security feature and a second adhesive layer thereon,
wherein the printed security feature is in predetermined registration with the one or more visible registration features of the first adhesive layer.

In a third aspect, the invention provides a method of manufacturing a laminate for a tamper-resistant document, the method comprising the steps of:
a) providing a carrier film;
b) applying a first adhesive layer to a surface of the carrier film, the first adhesive layer comprising one or more visible registration features;
c) bonding a first surface of a cover film to the first adhesive layer;
d) applying a second adhesive layer to a second surface of the cover film; and
e) printing a security feature on the second surface of the cover film, wherein the security feature is printed in predetermined registration with the one or more features of the first adhesive layer.

In a fourth aspect, invention provides a tamper resistant document having one or more pages, one page of the document comprising on a surface thereof:
printed security information; and
a cover film having a first surface comprising a printed security feature, the first surface being bonded to the surface of the page with an adhesive layer, the security feature being interposed between the cover film and the surface of the page, the cover film having a thickness of no greater than 12 microns.

In a fifth aspect, the invention provides a method of applying a tamper resistant laminate film to a page of an identity document, a surface of the page comprising printed details and an image of a user, the method comprising:
providing the laminate of the first aspect of the invention;
positioning the laminate on the surface of the page with the security feature in registration with the printed details and image of the user; and
heat sealing the second adhesive layer to the surface of the page.

In a sixth aspect, the invention provides a tamper resistant document having one or more pages, one page of the document comprising on a surface thereof:
a cover film having a first surface and a second surface; and
a carrier film having a first adhesive layer on a surface thereof, the first adhesive layer being removably bonded to the second surface of the cover film,
the first surface of the cover film being bonded to the surface of the page with a second adhesive layer, a security feature being interposed between the cover film and the surface of the page,
wherein an edge of the surface of the carrier film comprises a portion having a reduced adhesion to the cover film, the portion being adapted to enable a user to peel the carrier film away from the cover film.

Embodiments of the present invention will now be described by way of example and with reference to the accompanying drawings in which:

FIG. 1a shows a schematic plan view of a carrier film with an adhesive coating applied thereto;

FIG. 1b shows a schematic cross-sectional view of the carrier film and adhesive coating of FIG. 1a;

FIG. 2 shows a schematic cross-sectional view of a cover film as applied to the carrier film of FIG. 1;

FIG. 3a shows a schematic plan view of a laminate comprising an array of printed security designs as applied to the cover film of FIG. 2;

FIG. 3b shows a first alternative schematic cross-sectional view of the laminate of FIG. 3a;

FIG. 3c shows a second alternative schematic cross-sectional view of the laminate of FIG. 3a;

Figure 4:
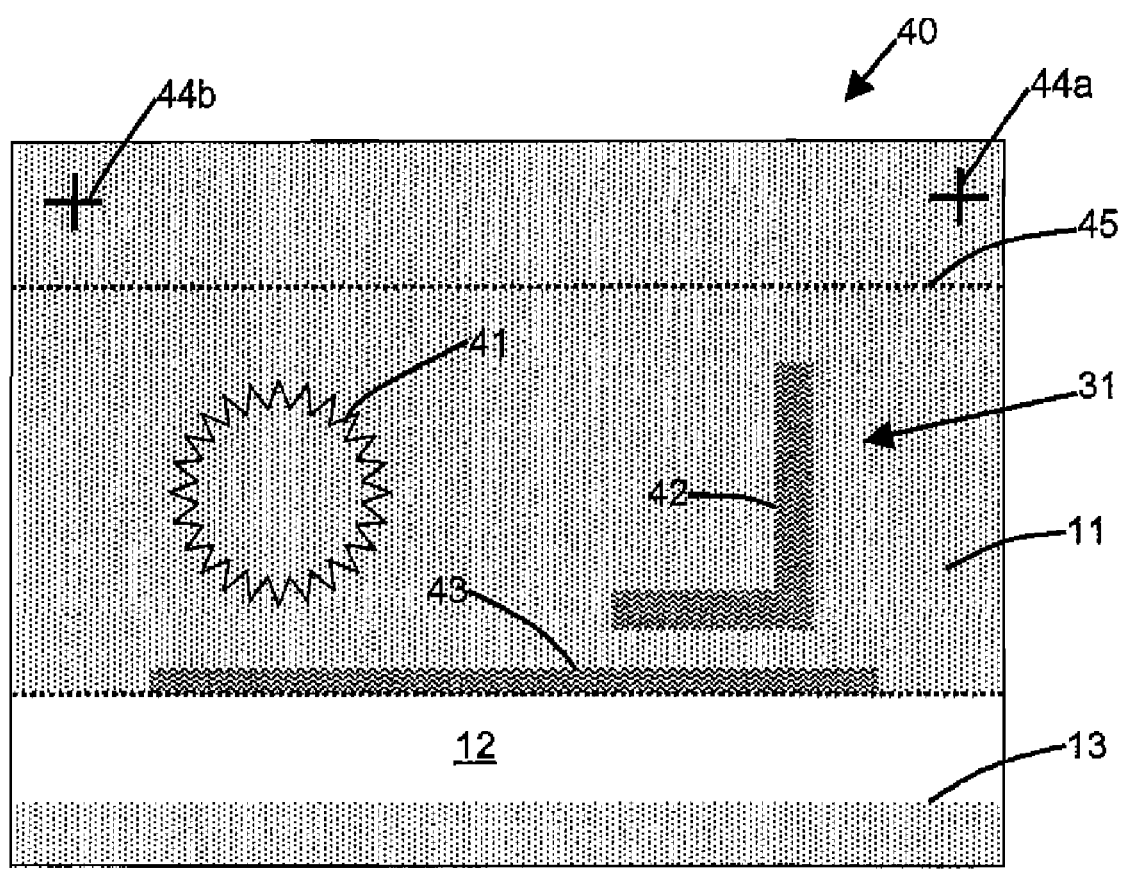
FIG. 4 shows a schematic plan view of a security laminate.

Shown in FIG. 1 is a carrier film 10 on which is coated, or otherwise applied, a first adhesive layer 11. The carrier in may be any suitable, preferably transparent, polymeric film material. One such material in common usage is polyester. A advantage of the carrier film being transparent is that the security document can be checked before the carrier film is removed. The manufacturer or supplier of the security document is thereby able to check the document before supply to the end user, who could be instructed to remove the carrier film.

The carrier film could alternatively be composed of, for example, a paper-based material.

The first adhesive layer 11 is applied such that one or more edges 13 are visible on the carrier film 10. In the example shown, the first adhesive layer 11 is applied as a discontinuous coating, for example in longitudinal stripes, with non-coated areas 12 between, straight edges 13 being defined at interfaces between coated areas 11 and non-coated areas 12.

In a general aspect, the first adhesive layer 11 is provided as a discontinuous coating over the surface of the carrier film 10, the edges 13 of the discontinuous coating providing visible registration features.

Conventionally, adhesive materials used for carrier films are substantially colourless and transparent. After coating and drying on a substrate such as the carrier film 10, any pattern or edges defined by such an adhesive material could therefore be difficult to determine, and might consequently be unsuitable for use as registration features for subsequent overlying layers or prints. The adhesive material of the invention may advantageously be made visible by, for example, adding a pigment to an otherwise transparent and colourless adhesive material. This enables features such as the edges 13 shown in FIG. 1a to be made visible, and therefore used as registration features. The expression 'visible' is, in this context, intended to encompass visible to the human eye and/or visible to a machine capable of detecting registration features.

Pigments or dyes may be used to colour the adhesive material. Suitable visible pigments may be titanium dioxide or organic or inorganic colourants. Pigments or dyes can be used that might not be visible to the human eye but which may be capable of detection by a suitable machine vision system. Such pigments or dyes can comprise or be composed of, for example, organic pigments, inorganic pigments or dye-based materials that are responsive to infrared and/or ultraviolet radiation.

In the above arrangements, the absence of adhesive material 11 in non-coated areas 12 prevents the carrier film from bonding to a cover film upon heat-sealing the films together.

In alternative arrangements, a further layer of non-adhesive material can be applied to the surface of the carrier film 10, for example over regions corresponding to the non-coated areas 12 in FIG. 1. The non-adhesive material can be applied over the adhesive material 11, and the adhesive material can cover substantially the whole of the carrier film. The non-adhesive material can be pigmented to be visible, in the same way as described above in relation to the adhesive material. The underlying adhesive material may be either unpigmented or differently pigmented compared with the non-adhesive material, so that registration to edges of the non-adhesive-material layer is possible.

In a general aspect therefore, the carrier film comprises portions having a reduced adhesion to the cover film, these portions being adapted to enable a user to peel the carrier film away from the cover film. Such portions may be obtained by either the absence of an adhesive material or by the addition of a further non-adhesive (or reduced adhesive) material layer. The non-adhesive layer may, for example, comprise a pigmented non-silicone release layer.

The use of a further non-adhesive material layer over the adhesive material serves at least two advantageous functions. Firstly, the non-adhesive layer prevents the underlying adhesive material from bonding with the carrier film during the lamination process. Secondly, the non-adhesive layer, if pigmented, can be used to provide registration features for further printing and laminating processes.

It is to be understood that further references to the adhesive layer 11 are intended to encompass arrangements which include the non-adhesive layer as a part thereof. For example, where registration features are provided, these may be provided on either (or both) of the adhesive and non-adhesive layers.

The adhesive layer 11 may alternatively be applied as a discontinuous coating, for example in the form of a plurality of spots or islands isolated from one another on the carrier film. A reduced adhesion may thereby be achieved through a reduction in the area density or size of the spots.

FIG. 1b shows a schematic cross-section along A-A' shown in FIG. 1a, with the first adhesive layer 11 as applied on a surface of the carrier film 10. The thicknesses of the adhesive layer 11 and the carrier film 10 are not to scale, and are exaggerated to illustrate the principle. Typically, the thickness of the carrier film 10 will be substantially greater, for example ten times that of the applied adhesive layer 11. While the cover film 20 may be 12 microns or thinner, the carrier film 10 may be in the region of 75 microns in thickness, therefore providing a degree of handling ability to the cover film. The thickness of the adhesive layer 11 depends on the particular formulation used and method of application, but may be of the order of tens of microns.

Shown in FIG. 2 is the carrier film 10 with first adhesive layer 11, and a cover film 20 applied. A first surface 20a of the cover film 20 is thereby bonded to the adhesive layer 11, for example by the application of heat and/or pressure across the thickness of both films 10, 11.

Preferably the adhesive layer 11 comprises a 'dry peel' adhesive material, i.e. an adhesive which allows the carrier film to be peeled away from the cover film, leaving little or no adhesive residue behind on the cover film. The adhesive layer 11 may have a low or reduced tack, for example in the form of a microsphere adhesive, advantages of which include the ability to reapply and a time-stable tack. Due to the adhesive 11 being more strongly bonded to the carrier film 10, e.g. through having a higher affinity to the carrier film surface, the cover film 20 can be subsequently removed from the carrier film 10 (or vice versa), e.g. by peeling, with the first adhesive layer 11 remaining entirely attached to the carrier film 10.

In an alternative arrangement, the adhesive layer 11 might instead be applied to the cover film 20 prior to bonding of the cover film 20 to the carrier film 10. Control of the affinity of the adhesive layer 11 to the cover film surface 20a and to the carrier film 10 can then result in the adhesive layer 11 being effectively transferred to the carrier film 10 upon peeling the carrier film 10 away from the cover film 20, leaving the intact adhesive layer 11 on the carrier film 10. In this alternative arrangement therefore, the first adhesive layer 11 is bonded to the surface 20a of the cover film 20 prior to the step of applying the first adhesive layer 11 to the surface of the carrier film 10.

FIG. 3 shows schematically a further process applied to the laminate of FIG. 2. In FIG. 3a, and in cross-section in FIGS. 3b and 3c, multiple printed designs 31 are applied to the second surface 20b of the cover film 20. The printed designs 31 preferably comprise one or more security features such as those given by example above. The printed designs 31, are preferably in registration with one or more features of the underlying first adhesive layer 11. Suitable registration features may be provided by the aforementioned visible edges 13. Other features such as fiducial marks or other common printing registration features may also or alternatively be provided in the first adhesive layer 11 so that the printed designs 31 may be registered with the adhesive layer.

It is to be understood that the term "registration" is intended to encompass a printed design 31 on the cover film 20 being repeatably aligned within the plane of the cover film 20 to a predetermined extent with respect to an underlying region of the first adhesive layer 11. For example, in the exemplary embodiment shown in FIG. 3a, each printed design 31 comprises at least one feature that is registered at a set position with respect to at least one of the linear axes x, y and with an axis of rotation θ, as referenced to an edge 13 of the first adhesive layer 11.

Registration of the printed design 31 may be achieved by various methods known to those skilled in the art. One preferred method, which can typically result in improved accuracy, repeatability and speed involves a machine vision system as part of an automatically adjustable printing apparatus. The machine vision system may be used to align the printing cylinder, plate or screen comprising the printed design 31 to be applied to the cover film 20 with one or more features of the first adhesive layer 11 such as the visible edges 13.

One possible method of registration of the printed features of the cover film to visible features of the carrier turn is by aligning visible edges of the adhesive layer 11 (or non-adhesive layer) relative to features provided on the cover film. Such features can, for example, be in the form of registration marks placed along the edges of the cover film. Alignment of these marks with edges 13 on the carrier film allows alignment, at least along the y axis, of the adhesive layer 11 with the printed features 31 of the cover film.

Once the printed features 31 are applied to the cover film 20, it is to be understood that registration of the designs 31 to any subsequent substrate the laminate is to be applied to may be achieved either by registering to features of the first adhesive layer 11 or to the printed designs 31, depending on specific requirements.

More than one printing process may be applied to the cover film, for example to apply more than one colour to a particular printed pattern or to apply different printed security features. Preferably, each process involves registration of the respective device, pattern or design to visible registration features of the underlying first adhesive layer 11. However, as explained further below, it is also possible to apply the security features to the cover filed prior to application of the cover film to the carrier film. It is to be understood that references to the printed designs or patterns 31 may include references to more than one separately printed design or pattern.

It is to be understood that references to printing or printing processes are intended to also encompass other similar types of processes of applying images, labels or other visible features to a substrate.

The second surface 20b of the cover film 20 is further provided with a second adhesive layer 32, as shown in FIGS. 3b and 3c (and not shown in FIG. 3a for clarity). The second adhesive layer may typically be a polyester or acrylic material. This second adhesive layer 32 is preferably provided over substantially the entire second surface 20b of the cover film 20, and covers at least the areas defined by the underlying first adhesive layer 11. The second adhesive layer 32 may be provided either as a layer prior to printing the designs 31, as shown in FIG. 3b, or as an overlying layer covering the printed designs 31, as shown in FIG. 3c. As for the first adhesive layer 11, the second adhesive layer 32 is shown in FIGS. 3b and 3c with an exaggerated thickness for clarity.

After the printed designs 31 and the second adhesive layer 32 are applied, the laminate 30 may be subdivided, for example by cutting into smaller units comprising one or more individual printed designs or patterns 31, each design or pattern 31 comprising one or more security features.

One such exemplary printed design 31 is shown schematically in FIG. 4, illustrating an exemplary laminate 40. FIG. 4 indicates the appearance of the laminate 40 in plan view from above the second surface 20b of the cover film (20, FIGS. 3a, 3b) and indicates the first adhesive layer 11 visible beneath the cover film 20. The second adhesive layer (32, FIGS. 3b, 3c) is provided covering the entire surface of the laminate 40. The printed design 31 comprises individual security features 41, 42, 43, such as a holographic image 41, and security printing features 42, 43.

The holographic image 41 on the cover film 20 may comprise a high refractive index (HRI) coating.

Registration features 44a, 44b may be provided as part of the printed design 31. A series of perforations 45 may also be provided through at least the carrier film 10, the perforations 45 allowing the carrier film 10 to be separated into two portions. The perforations 45 may be created at any suitable stage of the processes of creating the laminate, for example after the application of the printed design 31.

One or more non-coated (or non-adhesive coated) regions 12, bordered by visible edges 13 of the first adhesive layer 11, may be provided such that, after application of the laminate 40 to a substrate, the carrier film can be easily lifted off the cover film 20 and peeled away, as described in more detail below.

Figure 5:
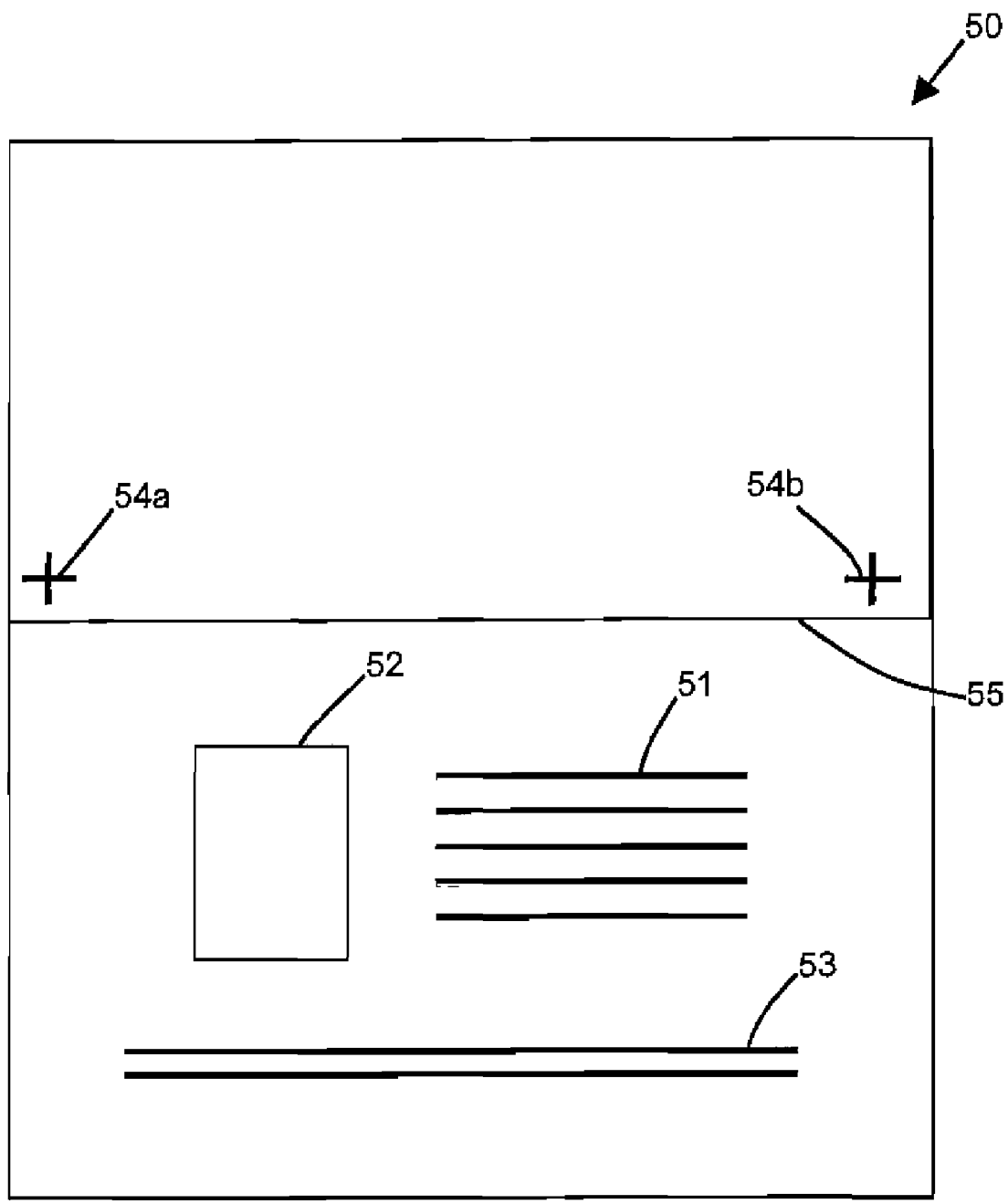
FIG. 5 shows a schematic plan view of an identity document.

An exemplary document 50, to which the laminate 40 of FIG. 4 is to be applied, is shown in FIG. 5. The document may comprise registration features 54a, 54b that correspond to the registration features 44a, 44b of the laminate 40.

The document of FIG. 5 comprises security features such as printed data 51, 53 and a photograph 52. These security features may for example refer to unique characteristics of a user of the document 50. If the document 50 is to comprise part of a booklet which may for example be a passport, a fold line 55 may be provided, along which other pages of the booklet may be attached by stitching.

Figure 6:
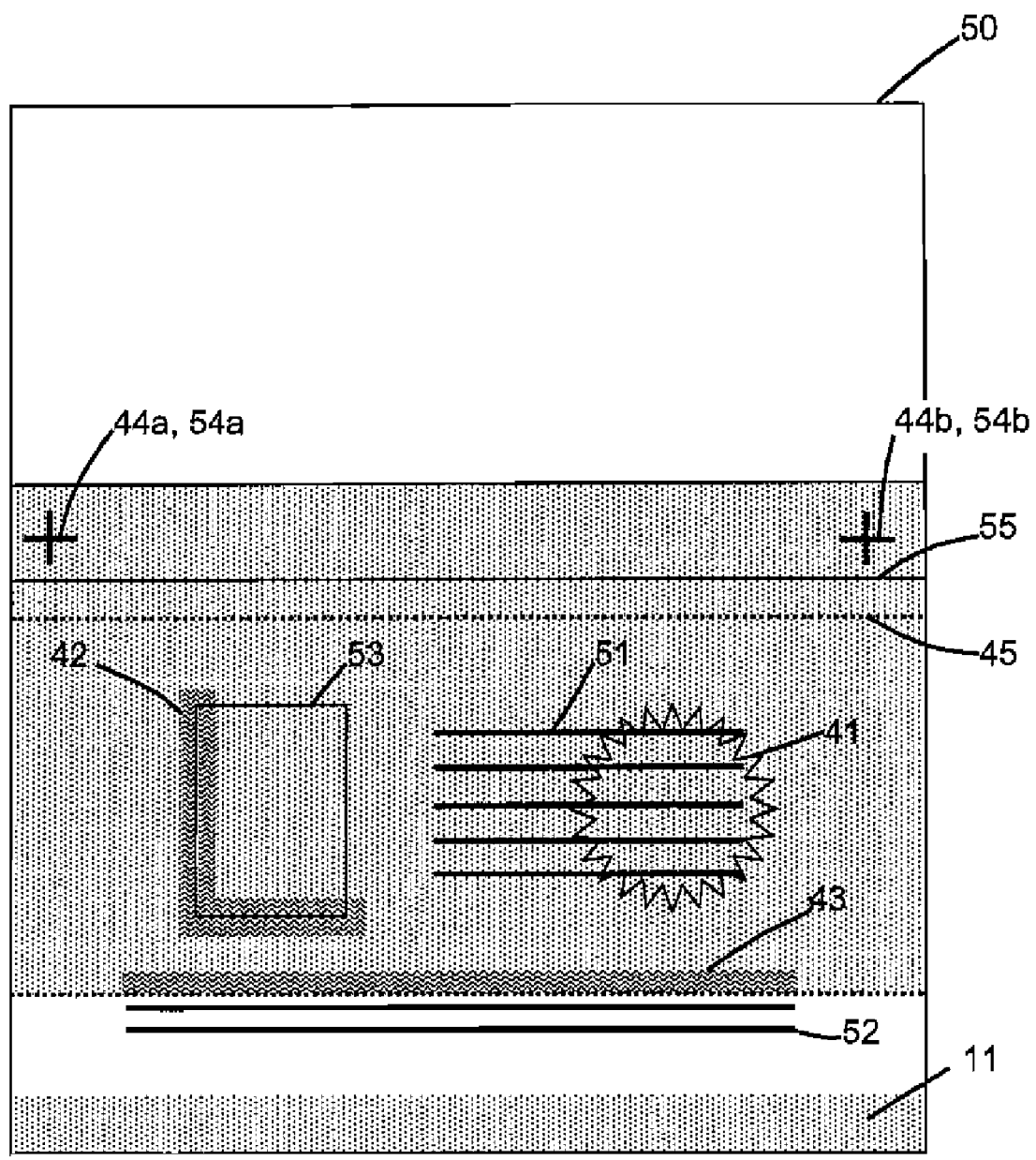
FIG. 6 shows the security laminate of FIG. 4 in place over the identity document of FIG. 5.

FIG. 6 illustrates the laminate of FIG. 4 in position over the document of FIG. 5, with the second surface 20b of the cover film 20 facing the document 50, the registration features 44a, 44b of the laminate in registration with the registration features 54a, 54b of the document 50. The security features 41, 42, 43 of the laminate 40 are thereby positioned in a predetermined relationship with the security information 51, 52, 53 on the document. For example, the registration of the laminate 40 with the document 50 allows a security feature 42 to at least partially overlap the security information such as a photograph 53, so that tampering of the information 53 would be apparent. The degree of overlap of any particular security feature 41, 42, 43 with a respective piece of security information 51, 52, 53 may be carefully chosen to maximise the tamper resistance of the laminated document thereby created.

Once the laminate 40 is permanently applied to the document 50, for example by a heat sealing process that activates the second adhesive layer 32 to bond with the document 50, the laminated document may then be trimmed. Trimming may be carried out to provide neat edges to the laminated document and to remove any registration features, which are now no longer needed.

Figure 7:
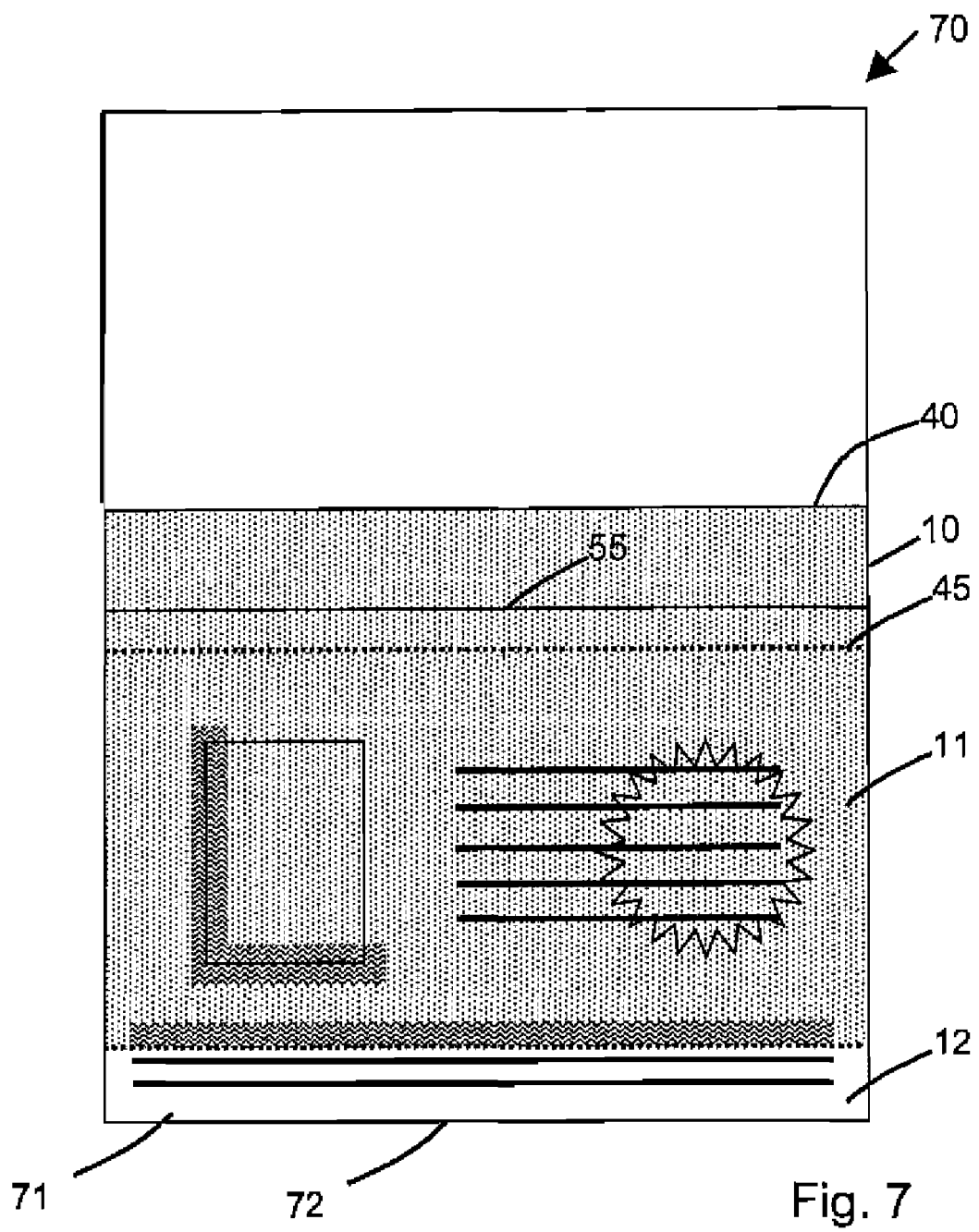
FIG. 7 shows the identity document and security laminate of FIG. 6 after a trimming operation.

A laminated document 70 is shown in FIG. 7 after such a trimming operation. The cover film (20, FIGS. 3a, 3b) together with the security features (41, 42, 43, FIG. 4) are now permanently attached to the document 50. The non-coated (or non-adhesive coated) region 12 now comprises a 'finger lift' portion 71 extending along an edge 72 of the laminated document 70. The finger lift portion 71 may alternatively be located on edges of the document other than shown in FIG. 7. The finger lift portion may alternatively extend over a length less than the full length of the document edge 72.

Figure 8:
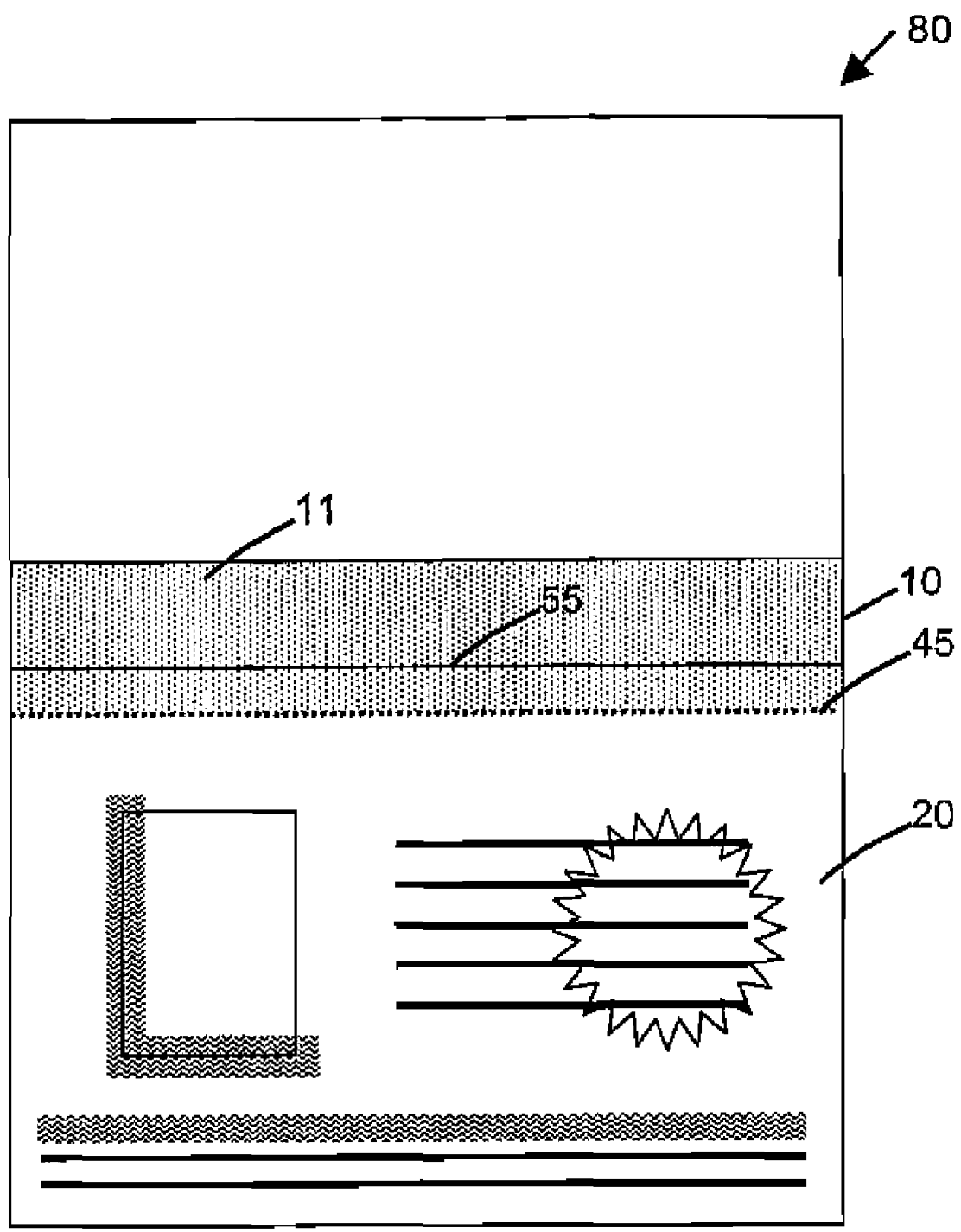
FIG. 8 shows the identity document and security laminate of FIG. 7 after removal of a portion of the carrier film.

Since the carrier film 10 is not strongly bonded to the cover film (20, FIGS. 3a, 3b) over this portion 71, the carrier film can easily be separated and lifted off by peeling. This lifting and peeling operation may be done before or after other pages are stitched to the document 70 along the fold line 55. If done before such a stitching operation, or if the document 50 consists of only one page, the entire carrier film 10 may be lifted off. If done after a stitching operation, a portion of the carrier film extending to the perforation line 45 may be removed, leaving behind a portion across the fold line 55. After such a removal process, the laminated document 80 in its final form is that shown in FIG. 8. The residual portion of the carrier film 10 and first adhesive layer 11 is shown either side of the fold line 55 up to the perforations 45.

The finger lift portion 71 of the carrier film 10 can comprise one or more printed messages that are removed along with the carrier film. Such messages may, for example, relate to instructing the user of the document to peel off the carrier film using the finger lift portion 71. The messages may comprise a further part of the security features relating to the document, for example by instructing the user to contact a particular telephone number or internet address to validate or confirm receipt of the document.

The laminated document 80, as resulting from the above described processes, has certain advantages. Firstly, the process of creating and applying the laminate to the document 40 using a carrier film allows the use of substantially thinner cover film than may otherwise be possible, since the cover film is handled only when attached to the carrier film, which may be of a thickness suitable for handling since it is to be eventually discarded. Typically, a suitable thickness of carrier film 10 may be around 50 microns or greater, which can readily be handled without creasing or tearing. The cover film is preferably substantially thinner than the carrier film. The cover film itself, i.e. without any additional printed or adhesive layers, may for example have a thickness of no greater than 12 microns, or alternatively no greater than 5 microns. The adhesive layer 32 (FIGS. 3b, 3c) is typically of the order of tens of microns in thickness, for example in the range of 30 to 35 microns. The adhesive layer 32 is, however, at least partially incorporated into the underlying security document through the process of heat sealing, and does not therefore form a substantial part of the cover film after attachment to the document.

A suitable exemplary cover film is a 4.5 micron thick PET or polyester film. This thickness of film is not manually handleable without tearing or creasing except in the form of a reel, in which form the cover film would typically be applied to the carrier film. Once applied therefore the cover film can be printed on and handled by virtue of the stability provided to it by the carrier film. The application of security features to the cover film, and their subsequent transfer to the laminated document, would not therefore generally be practical without the thicker carrier film acting as support. In certain aspects, however, it may be possible to apply security features, such as one or more HRI coatings, to the cover film prior to applying the cover film to the carrier film. In such aspects, the cover film incorporating security features may be prepared separately from the eventual laminate.

In a general aspect, the invention enables a cover film in the form of a thin film laminate to be formed as a protective security film of a document. Since printed security features are provided interposed between the cover film and the document, the laminated document has an improved level of security against tampering. Compared with a conventional thick film laminate (i.e. a laminate comprising a film of 50 microns or greater, and often between 75 and 125 microns), a thin film is practically impossible to remove intact, once applied to the document, for example by a heat sealing process. The document is thereby better protected against tampering, since any degree of tampering would inevitably affect the underlying security features, which are preferably made so as to be difficult to accurately replicate.

The film 20 of the thin film laminate therefore is preferably sufficiently thin that it has insufficient inherent structural integrity to survive any attempt to overcome the adhesion of the cover film to the substrate to which it is applied.

A further advantage of certain aspects of the invention is that, by using a visible first adhesive layer (11, FIGS. 1-3 & 7), registration of the first adhesive layer 11 to a printed design 31 is possible. In particular, registration of the security features (41, 42, 43, FIGS. 4 & 6) with the first adhesive layer 11 is possible. It is thereby possible to register both the security features 41, 42, 43 and the first adhesive layer 11 to features (51, 52, 53, FIGS. 5 & 6) on the document (50, FIG. 5). This permits the creation of the finger lift region (71, FIG. 7) in a defined location on the laminated document, which permits easy removal of at least a portion of the carrier film 10. Without the ability to accurately register the adhesive layer 11 to the document 70, such a finger lift region could not be accurately defined along an edge 72 of the document.

Other embodiments are also envisaged to be within the scope of the invention, as defined by the appended claims.

The invention claimed is:

1. A method of applying a tamper resistant laminate film to a page of an identity document, the method comprising:
   providing a laminate comprising:
      a carrier film having a first adhesive layer on a surface thereof, the first adhesive layer comprising one or more variations in composition or thickness that provide one or more visible registration features; and a cover film having a first surface removably bonded to the first adhesive layer and a second surface having a printed security feature and a second adhesive layer thereon, the cover film extending over the one or more visible registration features;

providing a page comprising printed details or an image of a user;

positioning the laminate on the surface of the page with the one or more visible registration features in registration with one or more features of the page; and sealing the second adhesive layer to the surface of the page.

2. The method of claim 1 further comprising the steps of: trimming one or more edges of the page of the identity document;

separating the first adhesive layer from the second surface of the cover film by peeling the carrier film from the cover film.

3. The method of claim 1 wherein the cover film has a thickness of no greater than 12 microns.

4. The method of claim 1 wherein the cover film has a thickness of no greater than 5 microns.

5. The method of claim 1 wherein the sealing of the second adhesive layer to the surface of the page comprises heat sealing the second adhesive layer to the surface of the page.

6. The method of claim 1 further comprising the step of trimming one or more edges of the page of the identity document to remove one or more page registration features.

7. The method of claim 1 further comprising separating the first adhesive layer from the second surface of the cover film by peeling the carrier film from the cover film.

8. The method of claim 1 wherein one or more page restriction features and one or more laminate registration features have approximately the same shape and bringing them into registration includes having the shapes at least partially overlap.

9. The method of claim 1 wherein the one or more visual registration features comprises a visible edge of the first adhesive layer and the one or more features of the page includes a piece of security information.

10. The method of claim 1 wherein the first adhesive layer comprises a dry peel adhesive.

11. The method of claim 1 wherein the second adhesive layer comprises a heat-sealable adhesive.

12. The method of claim 1 wherein the laminate comprises a series of perforations for separation of a portion of the carrier film from the laminate.

13. The method of claim 1 wherein the first adhesive layer comprises a mixture of a transparent adhesive material and a pigment.

14. The method of claim 1 wherein the one or more variations in composition or thickness comprise one or more discontinuities of the adhesive layer providing one or more visible edges of the first adhesive layer, the cover film extending over the one or more discontinuities.

15. The method of claim 1 wherein the cover film comprises a plurality of printed security features, each of the printed security features being in predetermined registration with at least one of the one or more visible registration features within a respective underlying region of the first adhesive layer.

16. The method of claim 1 wherein providing the laminate comprises the steps of:

a) providing the carrier film;

b) applying the first adhesive layer to a surface of the carrier film such that the first adhesive layer comprises variations in composition or thickness that provide the one or more visible registration features;

c) bonding the first surface of the cover film to the first adhesive layer such that the cover film extends over the one or more visible registration features;

d) applying the second adhesive layer to the second surface of the cover film;

e) detecting at least one of the one or more visible registration features; and f) printing the printed security feature on the second surface of the cover film in predetermined registration with the detected at least one visible registration feature.

17. The method of claim 16 wherein the step of printing the security feature on the second surface of the cover film is performed prior to the step of bonding the first surface of the cover film to the first adhesive layer.

18. The method of claim 16 wherein the first adhesive layer is bonded to the first surface of the cover film prior to the step of applying the first adhesive layer to the surface of the carrier film.

19. The method of claim 1 wherein an edge of the surface of the carrier film comprises a portion having a reduced adhesion to the cover film, the portion being adapted to enable a user to peel the carrier film away from the cover film.

20. The method of claim 19 wherein the portion of the carrier film surface has no adhesive layer thereon.

21. The method of claim 19 wherein the portion of the carrier film surface has a non-adhesive layer over the first adhesive layer.

22. The method of claim 21 wherein the non-adhesive layer is visibly distinct from the first adhesive layer.

23. The method of claim 22 wherein the non-adhesive layer contains a pigment.

24. The method of claim 1 wherein the identity document comprises a plurality of pages.

* * * * *